March 16, 1954 L. E. NORTON 2,672,557

MICROWAVE FREQUENCY CONTROL

Filed Nov. 19, 1951

INVENTOR
LOWELL E. NORTON
BY J. L. Whittaker
ATTORNEY

Patented Mar. 16, 1954

2,672,557

UNITED STATES PATENT OFFICE 2,672,557

MICROWAVE FREQUENCY CONTROL

Lowell E. Norton, Princeton, N. J., assignor to Radio Corporation of America, a corporation of Delaware Application November 19, 1951, Serial No. 257,109

1 Claim. (Cl. 250—36)

Figure 1:
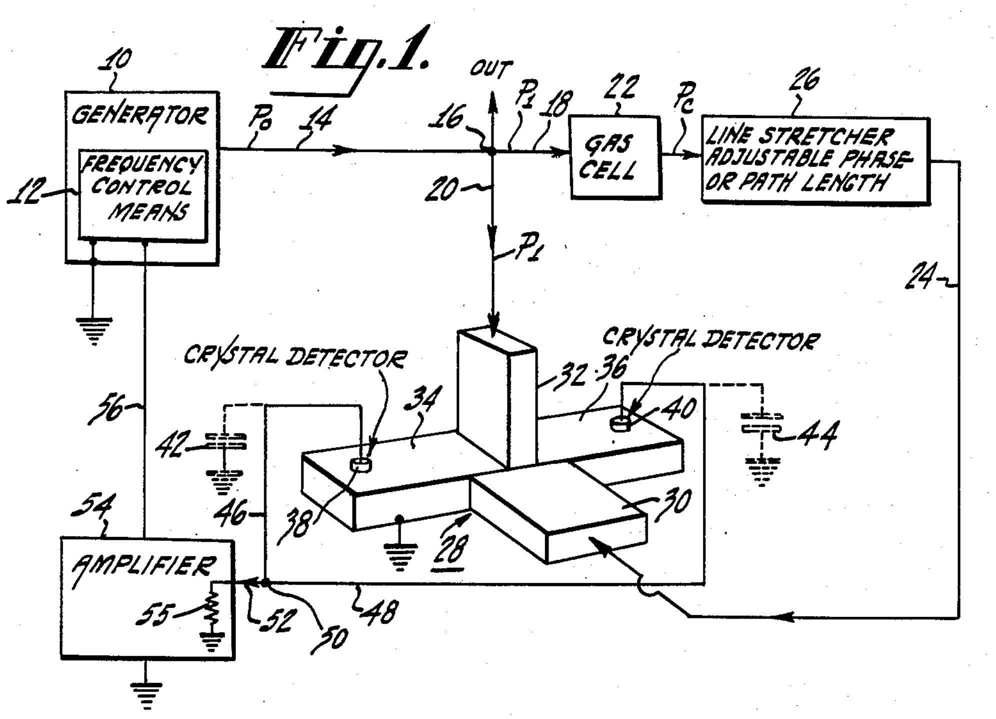

The present invention is related to microwave frequency control, and particularly to microwave frequency control with a gas cell.

It is known to employ a selectively resonant gas cell for the purposes of frequency control of an oscillator or generator of microwave energy. Examples of systems heretofore devised for the control or stabilization of microwave frequency generators may be found in the copending applications of William D. Hershberger, Serial No. 786,736, filed November 18, 1947; and Serial No. 4,497, filed January 27, 1948; and of Lowell E. Norton, Serial No. 5,603, filed January 31, 1948 now U. S. Patent 2,559,730. These systems are satisfactory. However, they require considerable equipment and are more or less complex in structure and arrangement.

It is an object of the present invention to provide an arrangement for microwave frequency control which is simpler than prior art arrangements.

It is another object of the invention to provide a microwave frequency stabilization system simplified over prior arrangements.

A further object of the invention is to provide an improved gas cell microwave frequency stabilization system, and one simplified in construction and arrangement.

In accordance with a preferred embodiment of the invention, a microwave generator is connected to supply energy to one arm of a first pair of arms of a bridge circuit, and through a molecular resonant gas cell to the other arm of the first pair. A detector is provided in each arm of the second pair. Energy directly from the generator and from the generator through the gas cell are thus applied to the detector arms from the bridge circuit. The detectors detect the energy thus applied to the input arms of the bridge circuit. The detectors are so connected that, in sense and magnitude, the low frequency output of the detectors combined corresponds in sense and magnitude primarily and critically to the differences in phase of the signals applied to the first pair of arms. This combined output is applied to the generator for frequency control, preferably through a suitable filter and amplifier. The system of the invention takes advantage of the anomalous dispersion characteristic of the gas cell, to cause the phase variations with departure of generator frequency from the resonant operating frequency of the gas cell. Therefore, the anomalous dispersion characteristic about the resonant operating frequency of energy passed through the gas cell is employed to provide the simple and convenient arrangement of the invention.

Preferably the bridge circuit is a hollow pipe waveguide magic T. Also, preferably the lengths of lines (in terms of phase shift at the operating frequency) from the generator to the bridge plane of symmetry (or magic T junction) and from the generator through the gas cell to the bridge plane of symmetry differ by $(2a-1)\pi/2$ radians of angular frequency or, what is the same, by an odd quarter wavelength at the resonant operating frequency. If the path difference of an odd quarter wavelength is thus accurately arranged, as by a line stretcher, one secures a greater degree of variation of control voltage with variations of the generator frequency from the gas resonance point of the gas cell than otherwise. However, great exactness, although desirable, is not essential for a workable arrangement since the magnitude of the control voltage decreases as cos $\delta$, where $\delta$ is the phase deviation from the desired $\pi/2$ difference. For small departure angles $\delta$, cos $\delta$ is very nearly unity and the decrease in control voltage is insignificant.

Figure 2:
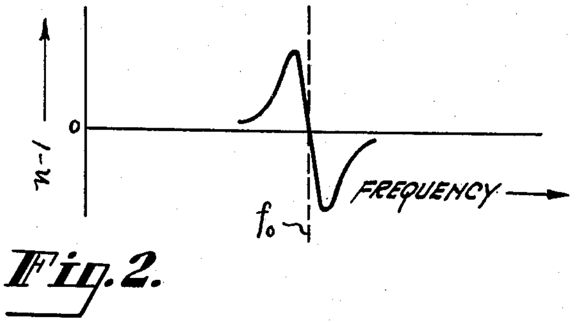

The foregoing and other objects, advantages, and novel features of the invention will be more apparent from the following description when taken in connection with the accompanying drawing in which:

Fig. 1 is a circuit diagram schematically representing a preferred embodiment of the invention; and Fig. 2 is a graph useful in explaining the operation of the embodiment of Fig. 1.

Referring to Fig. 1, a microwave generator 10 may be exemplified by any suitable known oscillator, for example a klystron or magnetron, which has an element or means 12 for receiving a frequency control voltage. Various microwave generators of this kind are known, the frequency of oscillations being responsive to the voltage applied to the means 12.

An output waveguide 14 receives energy from the generator 10. From a junction 16 of waveguides 18 and 20 with waveguide 14, some of the generator energy from the generator output connection 14 is applied by waveguide 18 to a microwave resonant absorption gas cell 22.

The gas cell 22 may be of the type disclosed or employed in any of the above-identified copending applications. The microwave energy transmitted through the gas cell 22 is applied by a waveguide 24 to one arm 30 of a magic T waveguide bridge 28. The waveguide 24 preferably includes means to vary the phase or path length of the microwave energy as indicated by a block 26 by suitable known means, generically termed a line stretcher.

The magic T 28 is one form of a bridge circuit. More generally, the bridge circuit employed in the invention has two pairs of arms and is characterized further by the fact that energy applied incident toward the bridge from one arm of one pair is equally divided between the two arms of the other pair. So far as energy incident toward the bridge from any one arm of one pair is concerned, the other arm of the same pair is decoupled therefrom. Other bridge circuits are known which are so characterized, for example so-called "rat races," which are suitable at the microwave frequencies here contemplated.

The arm 30 of magic T 28 receives the energy from the gas cell output waveguide 24. The arm 32 is paired with arm 30 and receives the microwave energy from the generator waveguide 20. The other pair of arms 34 and 36 have respectively oppositely polarized crystal detectors 38 and 40, located equidistant from the junction of the magic T 28 and the plane of symmetry between arms 34 and 36. Preferably the arms 34 and 36 have non-reflecting or matched terminations which include the crystals of detectors 38 and 40 respectively. Each of the crystal detectors 38 and 40 may include a by-pass capacitor, which may be part of the crystal holders, or part of the capacity of the output leads 46 and 48 from the crystals with the walls of arms 34 and 36. In any event, there should be sufficient by-pass capacity to filter out the microwave frequency. These filter capacities of the detector circuits are indicated schematically as dotted capacitors 42 and 44 for crystal detectors 38 and 40 respectively, connected between the output leads 46 and 48 respectively and ground. The detector output leads 46 and 48 are connected together at a junction 50 through a common connection 52 to the input circuit of an amplifier 54. The resistor 55 comprising said input circuit may be the common load resistor for the detectors 38 and 40. The amplifier 54 is preferably a D.-C. (direct current) amplifier which at its output connection 56 supplies the voltage from connection 52, amplified and with sensing, to the frequency control means 12 of the generator 10. However, the sensing may be about a particular voltage level which continuously biases the frequency control means. The characteristics of the amplifier 54 depend on the generator 10 and the type of frequency control means 12 which is employed, and in fact, the amplifier 54 may be considered a part of the frequency control means 12.

In operation, suppose the generator 10 to have an output on connection 14 of a frequency $f$, and with a so-called angular frequency $\omega=2\pi f$. The frequency $f$ should be and is assumed to be very near the resonant frequency $f_0$ of the gas in gas cell 22, say within 1%, and $\omega$ very near $\omega_0=2\pi f_0$.

The energy passing through the gas cell 22 may be considered as passing through a medium having an effective index of refraction $n$, where (1)

$$n^2-1=\frac{4\pi Ne^2}{m(\omega_0^2-\omega^2)}\left\{1=\left[\frac{\frac{\omega}{2\omega_0}\left(1+\frac{\omega}{\omega_0}\right)}{\tau^2[(\omega-\omega_0)^2+1/\tau^2]}\right]+\left[\frac{\frac{\omega}{2\omega_0}\left(1-\frac{\omega}{\omega_0}\right)}{\tau^2[(\omega+\omega_0)^2+1/\tau^2]}\right]\right\}$$

where $N$=number of molecules per unit volume;

$m$ and $e$ are respectively the mass and charge of the molecule as an oscillator in the electromagnetic field of the microwave energy in gas cell; and $\tau$ is the mean time interval between molecular collisions.

The above formula is derived in the article by Van Vleck and Weisskopf, volume 17 of the Review of Modern Physics (1945), starting at page 227, entitled On the Shape of Collision-Broadened Lines, and may be found at page 232, Formula 18 of the article.

Now $n^2-1$ is very much less than unity, so that the expression on the right hand side of Formula 1 above is very small, say less than a tenth, and in practical cases less than 1%. Therefore, to a good approximation one way write:

(2)

$$n=1+\frac{2\pi ne^2}{m(\omega_0^2-\omega^2)}\left\{1-\left[\frac{\frac{\omega}{2\omega_0}\left(1+\frac{\omega}{\omega_0}\right)}{\tau^2[(\omega-\omega_0)^2+1/\tau^2]}\right]+\left[\frac{\frac{\omega}{2\omega_0}\left(1-\frac{\omega}{\omega_0}\right)}{\tau^2[(\omega+\omega_0)^2+1/\tau^2]}\right]\right\}$$

Let $\Delta\omega=1/\tau$, so that $\Delta\omega$ corresponds substantially to the expected energy spectrum line width or band width due to collision broadening of molecules in the gas. Then from (2), as an identity, may be derived the following:

(3)

$$n-1=\frac{\pi Ne^2}{m\omega_0^2}\left\{\frac{\overline{\Delta\omega}^2-\omega_0(\omega-\omega_0)}{\overline{\Delta\omega}^2+(\omega-\omega_0)^2}+\frac{\overline{\Delta\omega}^2+\omega_0(\omega+\omega_0)}{\overline{\Delta\omega}^2+(\omega-\omega_0)^2}\right\}$$

If $v$ is the phase velocity of electromagnetic waves of energy passing through the gas medium:

(4)

$$V=\frac{c}{n}=f\cdot\lambda$$

where $\lambda$ is the wavelength in the medium. Therefore the change in phase in propagation through a path length L of the medium is (5)

$$\phi=\frac{2\pi L}{\lambda}=\frac{2\pi nL}{\lambda_0}$$

where $\lambda_0$ is the free space wavelength of microwave energy of frequency $f_0$.

The expression for $n$ afforded by Equation 3 may be substituted in Equation 5 to yield:

(6)

$$\phi=\frac{\omega L}{c}\left[1+\frac{\pi Ne^2}{m\omega_0^2}\left\{\frac{\overline{\Delta\omega}^2-\omega_0(\omega-\omega_0)}{\overline{\Delta\omega}^2+(\omega-\omega_0)^2}+\frac{\overline{\Delta\omega}^2+\omega_0(\omega+\omega_0)}{\overline{\Delta\omega}^2+(\omega+\omega_0)^2}\right\}\right]$$

Now let the power from the generator 10 be $P_0$ and that applied to arm 32 of magic T 28 be $P_1$, and let the power applied to gas cell 10 by waveguide 18 also be $P_1$.

Also let M be the fraction of power absorbed in the gas cell 10 at the frequency $f=f_0$. Then if the power out of the gas cell 10 to waveguide 24 is $P_c$, (7)

$$P_c=(1-M)P_1$$

at the frequency $f=f_0$ or $\omega=\omega_0$. For frequencies $\omega$ equal to or differing from $\omega_0$ by less than a few per cent, it may be shown that (8)

$$P_c=P_1\left[1-\frac{M}{1+\left(\frac{\omega-\omega_0}{\Delta\omega}\right)^2}\right]$$

approximately. Equation 8 above may be derived from consideration of the absorption coefficient a formula for which may be found at page 230 of the said Van Vleck and Weisskopf paper. In any practical microwave case, the approximation of (8) is very near an exact value being much closer than 1%.

Now the field strength at one detector due to energy $P_1$ from arm 32 may be written as $$E_1 = k\sqrt{P_1}\sin\omega t \tag{9}$$

and that at the same detector due to $P_c$ is $$E_2 = k\sqrt{P_1}\left[1 - \frac{M}{1+\left(\frac{\omega-\omega_0}{\Delta\omega}\right)^2}\right]^{1/2}\cos(\omega t+\phi) \tag{10}$$

assuming that the connections are so arranged that the total phase difference at the frequency $\omega=\omega_0$ from junction 16 to the plane of symmetry between arms 30 and 32 by the two energy paths is $(2a-1)\pi/2$ radians or an odd quarter wavelength at the mean operating frequency $f_0$, plus the phase shift $\phi$ through the gas cell. Then the angle $\phi$ is the frequency dependent phase angle given by Formula 6.

The field at one detector due to energy from both arms 30 and 32 is, therefore, $E_2+E_1$; whereas that at the other is $E_2-E_1$. Which field is at which detector depends on which field 30 or 32 leads and which lags the other.

We may assume that the crystal detectors are substantially square law detectors. Then the output voltage from one detector has the amplitude of $V_1$ where $$V_1 = K_1(E_2+E_1)^2 \tag{11}$$

and that from the other the amplitude of $V_2$ where $$V_2 = K_1(E_2-E_1)^2 \tag{12}$$

The detector outputs are combined in opposition, so that the net output voltage has the amplitude of V where $$V = 4K_1E_1E_2 \tag{13}$$

The voltage V appears at junction 50. Therefore, $$V = 4K_1K^2P_1\left[1-\frac{M}{1+\left(\frac{\omega-\omega_0}{\Delta\omega}\right)^2}\right]^{1/2}\{\sin\omega t\}\{\cos(\omega t+\phi)\} = 2K_1K^2P_1\left[1-\frac{M}{1+\left(\frac{\omega-\omega_0}{\Delta\omega}\right)^2}\right]^{1/2}[\sin(2\omega t+\phi)-\sin\phi] \tag{14}$$

But the by-pass capacities 42 and 44 operate to filter out the microwave frequency of (14). Therefore the voltage at junction 50 is $$V^1 = K\left[1-\frac{M}{1+(\omega-\omega_0)^2}\right]\sin\phi \tag{15}$$

substituting from (6), $$V^1 = K\left[1-\frac{M}{1+\left(\frac{\omega-\omega_0}{\Delta\omega}\right)^2}\right]\sin\frac{L\omega}{c}\left\{1+\frac{\pi Ne^2}{m\omega_0^2}\,\frac{\overline{\Delta\omega}^2-\omega_0(\omega-\omega_0)}{\Delta\omega^2+(\omega-\omega_0)^2}+\frac{\overline{\Delta\omega}^2+\omega_0(\omega+\omega_0)}{\overline{\Delta\omega}^2+(\omega+\omega_0)^2}\right\} \tag{16}$$

From 16 it is apparent that, for $\omega=\omega_0$, if the phase shift $\phi$ through the gas cell 10 is zero, by suitable choice of L and the difference between the waveguide lengths of waveguides 20 and 24 from junction 16 to the symmetry plane between arms 30 and 32 is a quarter wavelength (as postulated by Equations 9 and 10) then there is zero voltages at the junction 50. As the angular frequency $\omega$ changes, causing $\sin\phi$ to change, from $\phi=0$, the voltage $V^1$ changes also. Furthermore, as $\phi$ increases or decreases from the value $\phi=0$ (or $\pi$) with increasing or decreasing $\omega$, the sign of $V^1$ changes. Therefore, $V^1$ has sensing according to the departure of $\phi$ from zero and with the departure of $\omega$ from the value to make $\phi=0$. But this value of $\omega$ is very near $\omega_0$. In fact, at microwave frequencies of about $24\times10^9$ (corresponding to an ammonia gas spectral line of an ammonia gas cell often employed for stabilization) the error in accepting $\phi=0$ as the true value for $\phi$, when $\omega=\omega_0$, would be extremely small.

If the phase shift through the gas cell 10 is not zero, it is clear that suitable adjustment of the line stretcher 26 of waveguide 24 will cause the voltage at the plane of symmetry of arms 30 and 32 to be an odd quarter wavelength out of phase at the operating frequency $\omega=\omega_0$. Therefore it is clear that regardless of the length L, suitable adjustment of the adjustable phase or path length portion 26 of line 24 will make the device operable in the manner described.

An explanation less quantitative in nature of the operation of the arrangement of Fig. 1 may be advanced which, although not as accurate or detailed, suffices for a rough understanding of the physical effects and the control secured.

Consider the graph of Fig. 2 which shows the shape of the function $(n-1)$ plotted against frequency in the near neighborhood of a resonance frequency $f_0$ for energy passed through the gas cell 10. To a close approximation, $n-1=0$ for microwave frequency $f=f_0$. This curve may be thought of as a plot of the $n-1$ of Equation 3 above. This curve may also be considered as a phase shift curve. The portion above the axis represents phase shift in one sense, and that below the axis represents phase shift in a reverse or opposite sense. The reference voltage may be thought of as the microwave voltage output of the gas cell 22 at the frequency $f_0$. Then, the energy from waveguide 24 due to the gas cell 22, advances or retards (or vice versa) in phase in the fashion shown by the graph of Fig. 2, with frequency above or below $f_0$.

Now suppose the line length or phase of the adjustable path length 26 to be so adjusted that with the generator 10 generating oscillations of frequency $f=f_0$, and at the plane of symmetry between arms 30 and 32, the energy from the arms 30 and 32 arrives $\pi/2$ radians out of phase with each other. Now energy from arm 30 is in phase at equal distances in arms 34 and 36 from the junction; and energy from arm 32 is in opposite phase at equal distances in arms 34 and 36 from the junction. Therefore in one of arms 34 and 36 energy from arm 30 leads that from arm 32 by $\pi/2$ radians; and in the other arm of arms 34 and 36, energy from arm 30 lags that from arm 32 by $\pi/2$ radians. Therefore the fields at the detectors have the same amplitudes. If the detectors are appropriately connected, the voltages developed by the detectors and responsive each to the field in its respective arms, cancel or oppose at the junction 50.

Now if the frequency $f$ from the generator varies from $f_0$, the phase of the microwave energy at the magic T 28 from arm 30 is advanced or retarded, substantially according to the graph of Fig. 2, relative to the microwave energy from arm 32, which is correspondingly retarded or advanced. Therefore, depending on whether in one case the microwave energy frequency is above or in the other case below $f_0$, the output from one of detectors 38 or 40 exceeds that from the other and vice versa. But since the detectors are reversed in connection, this means that the detector voltages (or currents) are unequal, and that in one case the voltage at junction 50 is positive and in the other case negative. Therefore, the voltage at junction 50 in sense and magnitude corresponds to the departure of the microwave generator 10 energy from the gas cell resonance frequency $f_0$. The invention thus takes advantage of the anomalous dispersion characteristic illustrated in Fig. 2, to derive the desired control voltage in an extremely simple arrangement.

The control voltage at junction 50 applied to the amplifier 54 is amplified to provide the control voltage on connection 56. It will be understood that the voltage on connection 56 may be some arbitrary bias value, positive or negative, variation from which causes the generator 10 frequency to go up or down from the value $f_0$.

It will be understood that the various connections shown simply as lines may be two wire waveguides or coaxial line waveguides, or hollow pipe waveguides, as may best suit the particular frequencies to be employed. Thus connections 14, 18, 20 and 24 would in most practical cases be hollow pipe waveguides. Connections 46 and 48 may be two conductor lines, one conductor of which, however, may be a conventional ground return connection through the walls of the magic T arms, thence to the load resistor as schematically shown. Connection 56 also may include the conventionally shown ground conductor. It will also be understood that the crystal detectors may be other conventional types. Also, the detectors may be placed in the other pair of the bridge arms and the waveguides 20 and 24 connected to the other pair of arms each from that pair to which they are now connected, without affecting the operation. From the foregoing explanation, it is also apparent that adjustment of the line stretcher 26 may compensate for inequalities in the distances of detectors 38 and 40 from the plane of symmetry between arms 34 and 36.

It will be apparent from the foregoing that the gas cell frequency stabilizer system of the invention is especially simple in construction and arrangement, and readily assembled of standard parts.

What is claimed is:

A frequency stabilization system comprising a microwave frequency generator having a frequency control means responsive to a control effect, an energy absorbent gas cell connected to receive a portion of the microwave energy generated by said generator, a line stretcher, a single hollow pipe waveguide magic T having two pairs of arms of the type wherein each arm is decoupled for energy incident on the magic T from the other arm of the same pair, one arm of one said pair being connected to receive microwave energy after passage of said energy through said cell and through said line stretcher and the other arm of said one pair being connected to receive a portion of energy from said generator without passage through said gas cell, a pair of detectors one connected respectively to detect energy in each of the arms of the other pair of arms of said magic T, means connecting the said detectors to each other in opposition to provide a frequency control effect, and means coupling said frequency control means to said detectors to receive said frequency control effect, whereby the frequency of said generator is stabilized substantially at a resonant frequency of the gas of said gas cell.

LOWELL E. NORTON.

References Cited in the file of this patent

UNITED STATES PATENTS

| Number | Name | Date |
|---|---|---|
| 2,462,841 | Bruck et al. | Mar. 1, 1949 |
| 2,486,001 | Bruck et al. | Oct. 25, 1949 |
| 2,562,958 | Smullin et al. | Aug. 7, 1951 |
| 2,584,608 | Norton | Feb. 5, 1952 |